United States Patent
Gaskell et al.

[15] 3,652,863
[45] Mar. 28, 1972

[54] DETECTION OF FAULTS IN TRANSPARENT MATERIAL USING LASERS

[72] Inventors: Philip Hedley Gaskell, Preston; Derek Lowe, Rainford, both of England

[73] Assignee: Pilkington Brothers Limited, Liverpool, England

[22] Filed: May 18, 1970

[21] Appl. No.: 38,242

[30] Foreign Application Priority Data

May 21, 1969 Great Britain......................25,996/69

[52] U.S. Cl.......................... 250/219 DF, 250/224, 356/239
[51] Int. Cl.......................................................G01n 21/32
[58] Field of Search....................250/224, 219 DF; 356/239

[56] References Cited

UNITED STATES PATENTS

| | | | |
|---|---|---|---|
| 3,023,900 | 3/1962 | Thier | 250/219 DF X |
| 3,359,853 | 12/1967 | Benson et al | 250/219 DF X |
| 3,410,643 | 11/1968 | Jorgensen | 250/219 DF X |
| 3,445,672 | 5/1969 | Marks | 250/219 DF |
| 3,405,270 | 10/1968 | Briggs | 250/219 DF X |
| 3,206,603 | 9/1965 | Mauro | 250/219 DF X |

Primary Examiner—James W. Lawrence
Assistant Examiner—Davis L. Willis
Attorney—Sughrue, Rothwell, Mion, Zinn & Macpeak

[57] ABSTRACT

Apparatus for inspecting transparent sheet material for internal defects comprises a laser, a scanning device for scanning the laser beam across the sheet, and a light detector for detecting light scattered by internal defects. Analysing apparatus is used to analyze signals from the scattered light and thereby identify the nature of the defects. A reference light detector is positioned adjacent the edge of the sheet so that the time interval between detection of the beam by the reference detector and the detection of a defect gives a measure of the position of the defect.

11 Claims, 5 Drawing Figures

Inventors
PHILIP HEDLEY GASKELL
DEREK LOWE

By Sughrue, Rothwell,
Mion, Zinn & Macpeak
Attorneys 3,652,863

DETECTION OF FAULTS IN TRANSPARENT MATERIAL USING LASERS

BACKGROUND OF THE INVENTION

This invention relates to methods of and apparatus for inspecting transparent ribbon or sheet material and more particularly glass in sheet or ribbon form.

Various systems for inspecting glass in sheet or ribbon form have previously been proposed which utilize a light beam directed on to or through the glass and which detect a modulation which is normally a decrease, in the intensity of the reflected or transmitted beam indicative of the presence of a fault or defect in or on the glass. Thus, with such systems, the presence of a fault or defect is generally made apparent as a comparatively small change in the intensity of a light beam, and detector devices are required to distinguish between the normal intensity of the light beam and the slightly modulated intensity indicative of a fault or defect. The degree of modulation is usually dependent on the size and/or nature of the fault or defect and difficulties can sometimes be encountered in detecting faults or defects, particularly when the modulation caused thereby is very small, and/or when conditions are such that ambient light can affect the sensitivity of detection.

The present invention is concerned with internal defects in transparent sheet material, and it is an object of the invention to provide an improved detection system wherein a defect is made apparent by scattered light. With such a system the presence of a defect can be ascertained by detector devices which distinguish between the presence or absence of scattered light; in other words a defect can, in effect, be made apparent by a relatively bright spot or area against an essentially dark background. It is a further object of the invention to provide an improved detection system whereby the position of a defect can be ascertained.

SUMMARY

The present invention provides a method of inspecting transparent sheet material for internal defects which includes directing a laser beam into the sheet material, effecting relative movement between the laser beam and the sheet material so that the beam scans the sheet material, and detecting light scattered by a defect when the scanning beam impinges on the defect.

Preferably the method includes analyzing the light scattered by the defect thereby to identify the nature of the defect. This may be achieved by receiving light scattered by the defect on photoelectric means adapted to produce an electrical signal representative of the received scattered light, and analyzing the electrical signal to identify the nature of the defect.

Preferably the method also includes relating the time of detection of light scattered by a defect with the scanning cycle of the laser beam thereby to indicate the position of the defect. This may be done by detecting when the beam passes a reference position during its scan, and relating the time when the beam passes the reference position to the time when the beam impinges on the defect.

The invention also provides apparatus for inspecting transparent sheet material for internal defects comprising a laser, means to direct a light beam from the laser into the ribbon or sheet material, means to effect relative movement between the laser beam and the sheet material so that the beam makes successive scans across the sheet material, and defect detector means arranged to detect light scattered by a defect when the laser beam impinges on the defect.

The apparatus may include analyzer means adapted to analyze the light scattered by the defect thereby to identify the nature of the defect. Preferably said defect detector means comprise photoelectric means adapted to produce an electrical signal representative of light scattered by the defect and received by the photoelectric means, and said analyzer means are adapted to analyze the electrical signal.

It is also preferred that the apparatus include computer means operatively connected with said defect detector means and adapted to relate the time of detection of light scattered by a defect with the scanning cycle of the laser beam, thereby to indicate the position of the defect. For this purpose, the apparatus may include reference detector means arranged to detect when the laser beam passes a reference position during each scan, said computer means being operatively connected with said reference detector means and adapted to relate the time of detection of the laser beam by the reference detector means to the time of detection of a defect by the defect detector means.

DESCRIPTION OF THE PREFERRED EMBODIMENT

Figure 1:
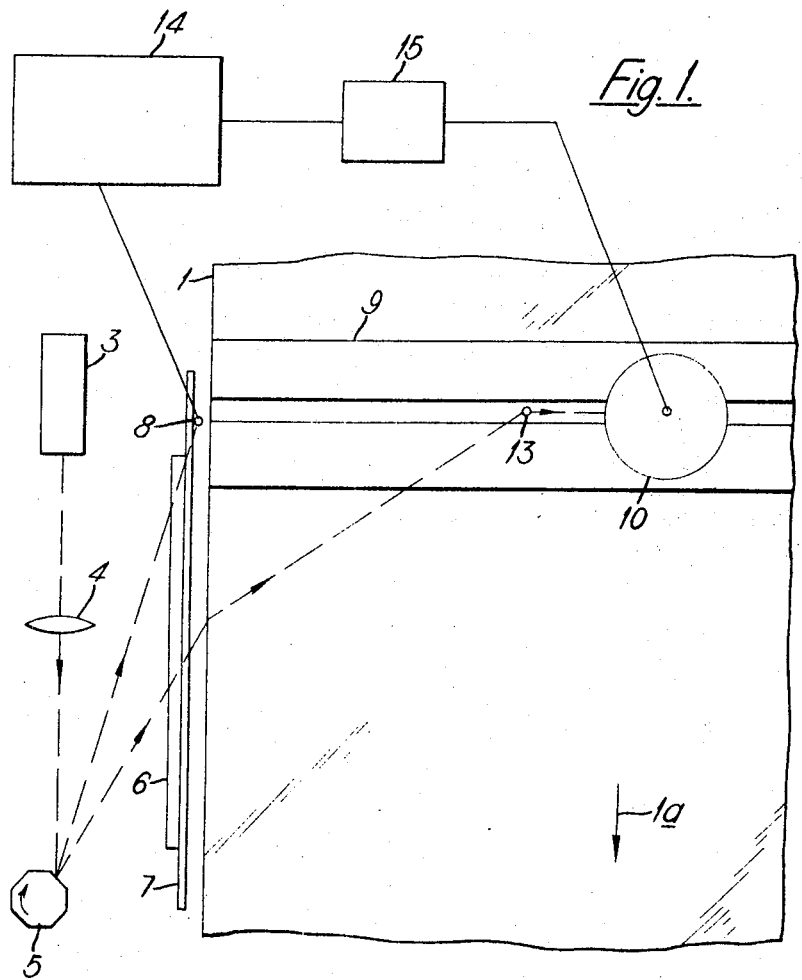
FIG. 1 is a diagrammatic plan view of one embodiment of apparatus for detecting internal defects in glass sheet material.
Figure 2:
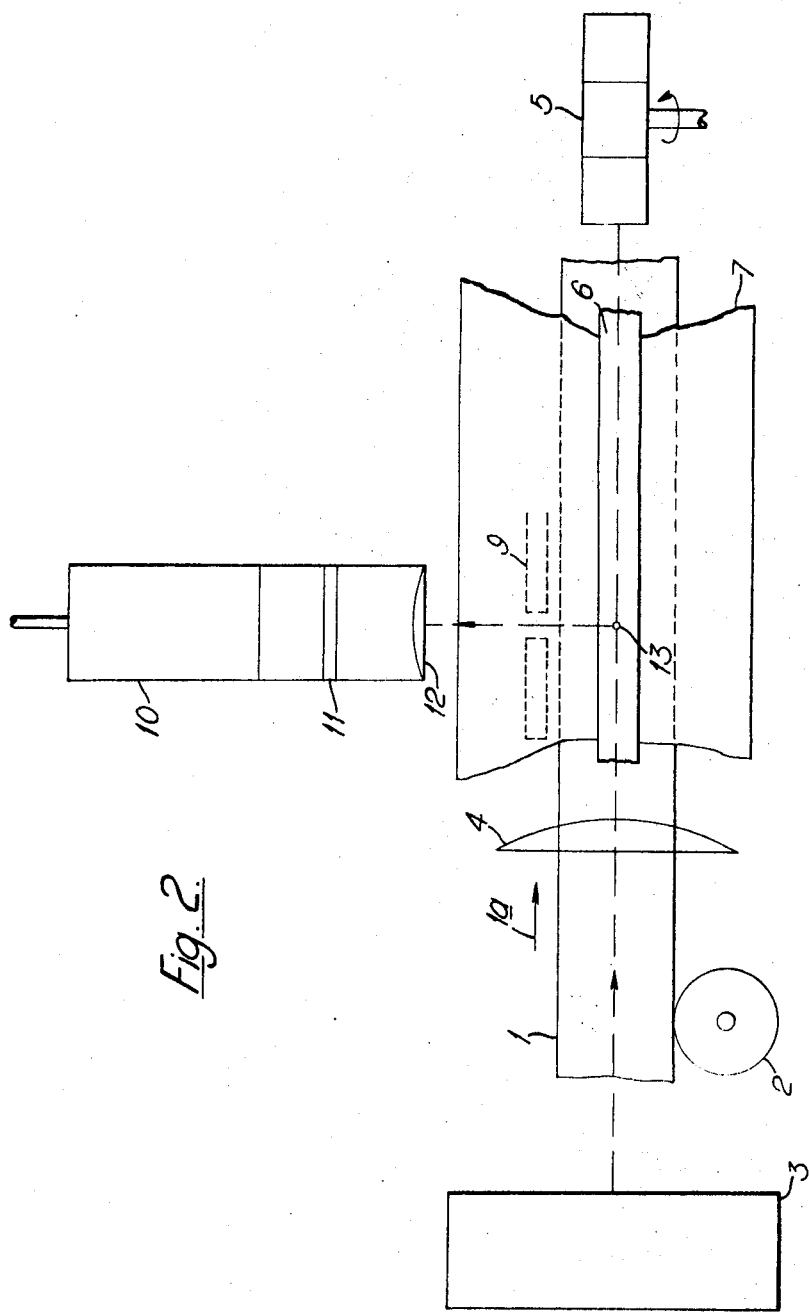
FIG. 2 is a diagrammatic side elevation of the apparatus shown in FIG. 1.

Referring to FIGS. 1 and 2, a horizontal continuous glass sheet or ribbon 1 issuing from a lehr is fed forwardly, in the direction indicated by an arrow 1a, at substantially constant speed by means of rollers 2 (only one of which is shown in FIG. 2). To one side of the ribbon 1 a laser 3 is positioned to direct a laser beam through a suitable lens 4 and on to a mirror member 5 driven to rotate at constant speed about a vertical axis. The light paths are shown in the drawings by broken lines. The member 5 has a plurality, shown as eight, of identical vertical mirrored faces, the laser beam impinging on the faces in succession as the member rotates in the direction indicated by the arrow. By this arrangement the laser beam reflected from the member 5 makes successive scans about an arc in a horizontal plane.

A cylindrical lens 6 is positioned in the path of the laser beam between the mirror member 5 and the edge of the glass ribbon 1. The laser beam emerging from the lens 6 enters the edge face of the glass ribbon obliquely, and the lens 6 effects a spreading of the beam in the glass sheet in a vertical plane. Between the lens 6 and the glass ribbon is an aperture element 7 having a narrow slit disposed parallel to the ribbon edge and positioned so that the laser beam passing through the slit enters the edge face of the glass ribbon centrally of its height, thereby minimizing the amount of light directly incident on the major (upper and lower) surfaces of the ribbon. The beam entering the glass ribbon travels therethrough and is contained between the upper and lower surfaces by a process of internal reflection. The lens 6 and the slit in the aperture element 7 extend across substantially the full arc of scan and are indicated cutaway in FIG. 2 for clarity.

A fixed photosensitive reference detector device 8 is located closely adjacent (but out of contact with) the edge of the moving glass ribbon at a position such that the laser beam impinges on the device at the beginning of each scan. Located a small height above the upper surface of the ribbon is a horizontal aperture element 9 having a narrow slit extending across the ribbon, normal to its direction of travel, and aligned with the photosensitive device 8. Vertically above the slit in the element 9 is a fixed photosensitive defect detector device 10 having an associated filter 11 and lens system 12. The slit in the element 9 serves to define a narrow band across the ribbon 1 surveyed by the detector device 10 and scanned by the laser beam.

The apparatus so far described operates as follows:

At the beginning of each scan the reflected laser beam emergent through the slit in the element 7 strikes the photosensitive device 8 which emits an electrical reference pulse or signal. The laser beam continues its scan across the ribbon, the narrow band thereof defined by the slit in the element 9 being surveyed throughout the scan by the defect detector device 10.

If there is a defect, such as a bubble or stone, in this portion of the ribbon, light from the laser beam will be scattered by the defect when it is struck by the beam. A defect is indicated at 13 in FIGS. 1 and 2. Light scattered by the defect emerges through the upper surface of the glass ribbon, through the slit in the element 9, and is received by the lens system 12, which focuses the light and directs it through the filter 11 on to the photosensitive device 10. The latter then emits an electrical pulse or signal indicating detection of a defect.

It will be seen that the time elapsed between emission of the reference pulse by the photosensitive device 8 and emission of the detection pulse by the photosensitive device 10 is a measure of the distance between the reference device 8 and the defect 13. By ascertaining this time interval, the distance of the defect from the edge of the glass ribbon can therefore be found.

This time interval is ascertained by a computer means including electronic logic circuitry, indicated as 14, with which the photosensitive devices 8 and 10 are connected, the latter via an amplifier 15. The electrical connecting wires are represented by unbroken lines. The circuitry 14 receives the reference pulse from the device 8 and the amplified defect-indicative pulse from the device 10, and translates the time interval therebetween into an electrical quantity representative of the distance of the defect from the reference device 8.

It will be seen that if the ribbon edge maintains a constant positional relationship to the reference device 8, the actual position of a detected defect in the ribbon will be ascertained. However, to provide for the possibility of ribbon wander whereby the position of the edge of the ribbon relative to the reference device 8 may vary slightly, the reference device 8 may be suitably shielded so that it receives only light reflected from the edge of the ribbon thereby to produce a reference signal which is directly dependent on the actual position of the ribbon edge.

It will further be seen that the slit in the element 9 delimits the position of the defect in the direction of travel of the ribbon to the narrow band directly under the slit during the scan when the defect was detected. The position of the defect relative to the ribbon 1 as considered in its direction of travel and in the direction normal thereto is therefore ascertained by the logic circuitry 14.

Successive scans by the laser beam examine successive narrow bands across the ribbon 1, the rate of advancement of the latter relative to the rate of rotation of the mirror member 5 being such that every part of the ribbon is examined, i.e., the successive bands respectively examined by successive scans are contiguous or they may be made slightly overlapping.

The reference and detection pulses or signals fed by the detector devices 8 and 10, respectively, to the logic circuitry 14 provide the latter with sufficient information to compute and record in a store the positions of defects in the glass ribbon 1. The computed data may be used for any desired purpose. As examples, the logic circuitry may control marking devices positioned over the ribbon downstream of the inspecting apparatus so that they mark the upper surface of the ribbon over the defects; the logic circuitry may control cutting devices so that the ribbon is cut into sheets in a manner such that the defects are located in the cut sheets at positions where their presence is of no real disadvantage; the data may be recorded in suitable form and stored for subsequent reference when determining the optimum manner to cut the ribbon into sheets free from defects and with minimum glass wastage; and/or the logic circuitry may control cutting devices which effect cutting in such optimum manner.

The duration of a pulse or signal emitted by the defect detector 10, which is dependent on the rate of rotation of the mirror member 5 and the breadth (in the horizontal plane) of the laser beam, is also dependent on the size of the defect. Additionally, the duration and intensity of the pulse or signal is dependent on the nature of the defect. The magnitude and shape of the pulses or signals emitted by the detector 10 may therefore be further processed by the logic circuitry 14 to distinguish between large and small defects, and/or to establish the distribution of defects by size, and/or to distinguish between types of defects such as bubbles, stones, etc., since it is well known from scattering theory that the polar diagram of the scattered radiation varies as a function of the optical constants of the material of the inclusion and the size of the inclusion.

Since the photosensitive device 10 detects light scattered by a defect, it effectively sees a bright spot or area against an essentially dark background. When no defect is present the detector device 10 receives substantially no light from the laser beam. By this arrangement the detector is required, when simply detecting the presence of a defect merely to distinguish between the presence and absence of scattered light, and a high sensitivity of detection can therefore be achieved so that relatively small defects can be found.

The filter 11 associated with the detector device is selected in relation to the wavelength of light emitted by the laser 3 to restrict the light reaching the detector to a narrow wavelength band centered round the laser wavelength. This considerably reduces the risk of ambient light reaching the detector and adversely affecting its effective sensitivity. The particular type of laser used is preferably selected to emit light of a wavelength as near as possible to the maximum transmission wavelength of the glass. Thus, for example, when inspecting glass having a maximum transmission at a wavelength of 5,000 A an argon ion laser having major emissions at wavelengths of 4,880 A and 5,145 A can advantageously be used. Other suitable lasers, notably solid state lasers, may, however, usefully be employed.

The cylindrical lens 6 which, as previously explained, acts to effect a spreading of the laser beam in the glass ribbon in a vertical plane, is preferably included in the apparatus, but may, when examining some types of glass, be omitted since refractive index gradients in the glass will effect the desired spreading.

The slit in the element 7 which, as previously described, serves to ensure that the laser beam enters the glass ribbon substantially centrally of its height, acts to minimize detection of spurious defects such as dust or surface marks on the ribbon.

Notable modifications which may be made to the apparatus particularly described above with reference to FIG. 1 and 2 are as follows:

There may be provided two photosensitive defect detector devices directed to view the same portion of the glass ribbon, the electrical signals or pulses generated by both the detectors on receipt of light scattered by a defect being fed through an amplifier to the logic circuitry. By providing such twin detectors the signal/noise ratio can be improved.

There may be provided an integrating enclosure disposed to surround the portion of the glass ribbon being inspected, the enclosure being coated with a highly reflecting material, which may be metallic coating or may be applied as a fine powder. Such an enclosure serves to increase the amount of scattered light incident on the photosensitive defect detector when a defect is found.

The lens system 12 associated with the defect detector 10 may be replaced or augmented by a system of fiber optics arranged to receive light scattered by a defect and direct it to the detector 10 (via the filter 11). Preferably the fiber optics consist of a bunch of glass fibers of suitable composition, the bunch being shaped so that one end has an elongated rectangular cross section while the other end has a circular cross section. The rectangular end is placed facing the glass ribbon with its major axis across the ribbon, i.e., normal to its direction of movement, and the circular end is disposed facing the photosensitive defect detector so that light scattered by a defect is transmitted thereto. By such use of fiber optics the defect detector may be mounted in any convenient position, scattered light being transmitted thereto, if necessary via a nonlinear path, by the fiber optics.

Figure 5:
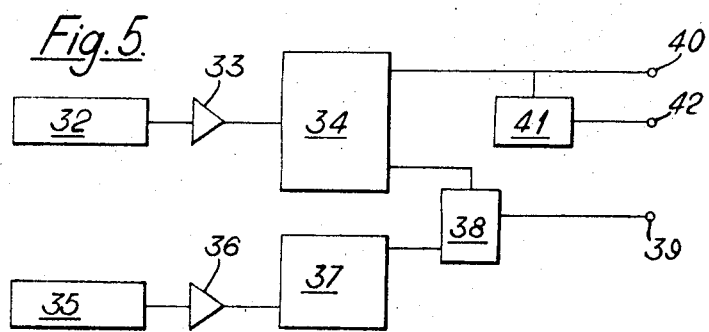
FIG. 5 is a diagrammatic representation of means for analyzing light scattered by internal defects.

In order to distinguish between types of defects, two photosensitive defect detectors are preferably provided instead of the one detector 10, one positioned to receive forward scattered light from the defect and the other positioned to receive back scattered light from the defect. FIG. 5 diagrammatically shows a circuit for analyzing signals resulting from a detected defect with such an arrangement. The apparatus of FIG. 5 may be used with the arrangements of FIGS. 1 and 2 or 3 and 4 provided two detectors are used and it enables analysis of the light scattered by the defect. A photosensitive defect detector 32 positioned on one side of the ribbon to receive forward scattered light from a defect emits an electrical signal via an amplifier 33 to signal shaping means 34. A second photosensitive defect detector 35 positioned on the other side of the ribbon to receive back scattered light from the defect emits an electrical signal via an amplifier 36 to a signal shaping means 37. Outputs from the signal shaping means 34 and from the signal shaping means 37 are fed to a comparator 38 which compares the signals. Solid inclusions in the glass ribbon give comparable forward and back scattered light so that if the detected defect is solid, in particular a stone, the electrical signals representative of the forward and back scattered light will be comparable. Bubbles, on the other hand, usually give greater forward scattered light than back scattered light. The comparator 38 thus compares these signals and emits an output to a terminal 39 if such comparison indicates a defect of a particular nature. A further output from the signal shaping means 34 leads to a terminal 40 to which a signal is fed in the event of the comparator 38 indicating that the detected defect is of a nature different from that appropriate to an output signal to the terminal 39. A lead from the output to the terminal 40 passes through a size indicative device 41 which analyses the received signal to provide an indication of the size of the defect and emits an appropriate signal to an output terminal 42.

Figure 3:
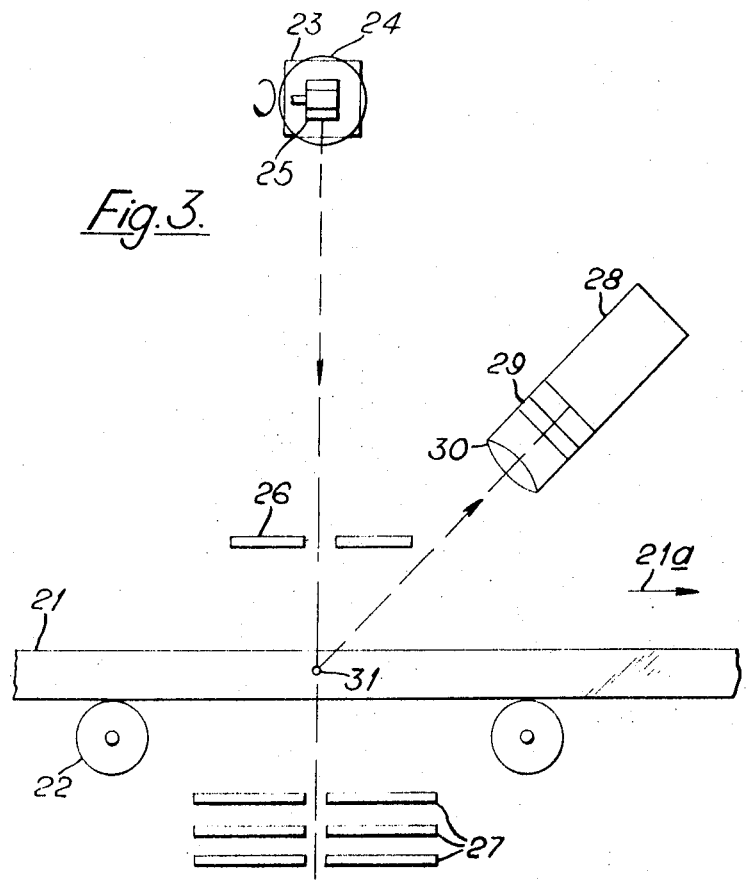
FIG. 3 is a diagrammatic side elevation of a second embodiment of apparatus for detecting internal defects in glass sheet material.
Figure 4:
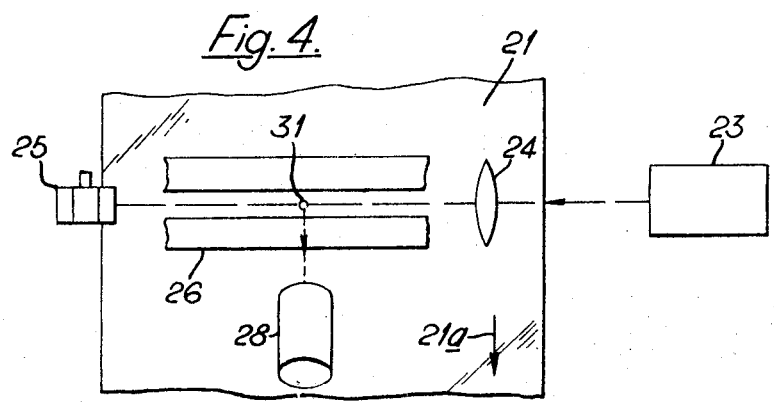
FIG. 4 is a diagrammatic plan view of the apparatus shown in FIG. 3.

Referring now to FIGS. 3 and 4, in the embodiment there shown a continuous horizontal glass sheet or ribbon 21 issuing from a lehr is fed forwardly in the direction indicated by an arrow 21a at substantially constant speed by means of rollers 22. At a level above that of the glass ribbon is a laser 23 positioned to direct a laser beam through a suitable lens 24 on to a mirror member 25 located above the ribbon.

The mirror member 25 has a plurality, for example eight, of horizontal mirrored faces and is driven to rotate at constant speed about a horizontal axis parallel to the direction of travel of the glass ribbon 21. The laser beam is reflected from successive faces of the member 25 so that the reflected beam makes successive scans across the ribbon in a vertical plane. Disposed between the mirror member 25 and the ribbon 21 is an aperture element 26 having a narrow slit extending across the ribbon i.e., normal to its direction of travel, and effectively defining a narrow band thereof which is scanned by the laser beam.

The laser beam passes through the slit in the element 26 and enters the glass ribbon through the upper surface. Located beneath the ribbon is a series of aperture elements 27 each having a narrow slit disposed vertically beneath the slit in the element 26. The laser beam emerging from the lower surface of the ribbon 21 passes through the slits in the elements 27, the latter serving to minimize back-scatter of light upwardly.

A photosensitive defect detector device 28, with an associated filter 29 and lens system 30, is positioned above the ribbon 21 and disposed at an angle to the vertical plane of scan of the laser beam so as to survey the narrow band of the ribbon across which the laser beam scans. If during a scan the laser beam strikes a defect (indicated as 31) in the glass ribbon, light scattered by the defect is focused by the lens system 30 through the filter 29 on to the photosensitive detector 28. The angle of inclination of the detector assembly to the vertical is selected to optimize the ratio of light scattered by a defect received by the detector to background light, for example from surface markings on the ribbon, and may be about 40°.

A reference photosensitive detector device, not shown in FIGS. 3 and 4, is positioned closely adjacent an edge of the ribbon 21 and in alignment with the slit in the element 26, so that the laser beam impinges on the reference detector at the beginning of each scan. As previously mentioned in relation to the embodiment shown in FIGS. 1 and 2, the reference detector may be suitably positioned and shielded to receive light reflected from the glass ribbon so that as the laser beam travels across the edge of the ribbon such reflected light becomes cut off. In this manner the reference detector can provide a signal directly dependent on the actual position of the ribbon edge, thereby making allowance for slight ribbon wander. In the same manner as described in relation to the embodiment shown in FIGS. 1 and 2, the reference detector transmits an electrical pulse or signal to electronic logic circuitry, to which the defect detector transmits an electrical pulse or signal, via an amplifier, on detection of a defect. The logic circuitry processes signals so received, including ascertaining the time interval between the reference signal and a defect signal in a scan, and thereby computes the positions and/or sizes and/or types of defects detected, as previously described in relation to the embodiment of FIGS. 1 and 2.

The photosensitive device 28 in the embodiment of FIGS. 3 and 4, like the device 10 in the embodiment of FIGS. 1 and 2, detects light scattered by a defect and therefore effectively sees a bright spot or area against an essentially dark background. As previously mentioned, such an arrangement permits a high sensitivity of detection to be achieved.

Since, in the embodiment of FIGS. 3 and 4, the laser beam travels through the relatively small thickness of the glass ribbon, the desirability of a high powered laser, and of matching the wavelength of laser emission with the maximum transmission wavelength of the glass, is not as important as in the embodiment of FIGS. 1 and 2, where the laser beam travels through the glass ribbon across its width. Thus in the embodiment of FIGS. 3 and 4, a relatively low powered helium-neon laser may satisfactorily be used. The filter 29 associated with the photosensitive detector 30 is selected to restrict light reaching the detector to a narrow wavelength band centered round the laser wavelength.

The previously described modifications to the embodiment of FIGS. 1 and 2 namely twin defect detectors, an integrating enclosure for scattered light, and/or a fiber optics system to transmit scattered light to the defect detector, may also be applied to the embodiment of FIGS. 3 and 4.

A further notable modification which may be applied to the embodiment of FIGS. 3 and 4 includes the step of monitoring the state of polarization of light scattered by a defect, thereby to distinguish defects within the body of the glass from surface markings, and/or to distinguish between different types of defects such as bubbles and stones. Light emitted by the laser is strongly polarized, and, by suitably arranging the angles of the mirrored faces of the member 25 and the lens 24, the strong polarization can be maintained in the laser beam which actually scans the glass ribbon. A polarized filter or filters can then be included in the optics associated with the photosensitive detector 28 so that the latter monitors the polarization of light scattered by a defect.

In the interests of clarity, only one laser and defect detector device is described in each of the particular embodiments. It will be appreciated, however, that a plurality may be employed if desired, particularly if the dimensions of the glass ribbon are such as to warrant it. Thus, in the embodiment of FIGS. 1 and 2, the described apparatus may be duplicated to provide a laser on each side of the ribbon, each laser and its associated detector device being used to scan and inspect one-half of the ribbon's width. In the embodiment of FIGS. 3 and 4, the apparatus described may be repeated at intervals across the ribbon so that each set inspects a band running lengthwise of the ribbon.

Also, a plurality of defect detecting devices as described above may be spaced along the direction of travel of the ribbon, instead of the single detector 10 or 28, the arrangement being such that each device effectively scans narrow bands of the ribbon spaced along its direction of travel, the space between bands scanned by one detector device being scanned by one or more other detector devices so that, in result, substantially the whole of the ribbon is scanned.

It will further be appreciated that the particular dispositions of the apparatus relative to the ribbon described in both embodiments are given only by way of illustration and example. Thus, in the embodiment of FIGS. 1 and 2, the defect detection devices could be below instead of above the horizontal ribbon. In the embodiment of FIGS. 3 and 4, the laser and optics for directing its beam could be below the ribbon, so that the beam enters the glass through its lower surface, and/or the defect detection devices could be below the ribbon.

Yet further, the described arrangement for effecting scanning of the laser beam, namely the rotating mirror members 5 and 25, could be replaced by any suitable mechanical or electromechanical system. Additionally, a subsidiary optical device, such as a specially shaped mirror, could be used to adjust the angle scanned per unit of time to conform to any predetermined program of scanning cycle, thereby to optimize detection efficiency.

We claim:

1. A method of inspecting transparent sheet material for internal defects which includes directing a laser beam into the sheet material, effecting relative movement between the laser beam and the sheet material so that the beam scans the sheet material, locating a light detector at a position removed from the normal light entry and exit paths from the sheet and detecting light scattered in a direction away from the said entry and exit paths by a defect when the scanning beam impinges on the defect, whereby a defect is detected by the detector as a light area against a relatively dark background.

2. A method according to claim 1 in which the laser beam is directed to enter the sheet material through an edge face thereof and the detector detects light scattered through a major surface of the sheet material.

3. Apparatus for inspecting transparent sheet material for internal defects comprising a laser, means for directing a light beam from the laser into the sheet material, scanning means for effecting relative movement between the laser beam and the sheet material so that the beam makes successive scans across the sheet material, and a light detector located at a position removed from the normal light entry and exit paths from the sheet and arranged to detect light scattered in a direction away from the said entry and exit paths by a defect when the scanning beam impinges on the defect.

4. Apparatus according to claim 3, wherein said light detector means comprise photoelectric means adapted to produce an electric signal representative of light scattered by the defect, analyzer means being provided for analyzing the light scattered by the defect thereby to identify the nature of the defect.

5. Apparatus according to claim 3 including a multifaced rotatable reflector positioned so that reflection of the laser beam from each reflecting face effects one scan of the beam, and an opaque slit member having an elongated light transmitting slit extending across the sheet material defining a narrow band along which the laser beam may scan.

6. Apparatus according to claim 3 wherein said light detector has an associated filter which passes a narrow waveband of light including the wavelength of the laser beam.

7. Apparatus according to claim 3, wherein the means directing the laser beam towards the sheet is arranged to direct the beam through a major surface of the sheet, and the light detector means is positioned to receive light scattered by a defect at an angle inclined to the major surface of the sheet material.

8. Apparatus according to claim 3, in which the light detector means comprises two photoelectric devices, one arranged on one side of the sheet material to detect forward scattered light and the other located on the other side of the sheet material to detect back scattered light.

9. Apparatus as claimed in claim 3, wherein the laser beam is directed to enter the sheet material obliquely through an edge face thereof, and the defect detector means is positioned facing a major surface of the sheet material to receive light scattered by a defect and emerging therethrough.

10. Apparatus as claimed in claim 9, in which an apertured member is interposed between the laser and the edge face of the sheet material and has a slit arranged parallel to the edge face and positioned so that the beam enters the edge face centrally of its height.

11. Apparatus as claimed in claim 9, including a cylindrical lens, arranged to effect spreading of the laser beam in a plane normal to the major surface of the sheet material.

* * * * *